(12) United States Patent
Bantle et al.

(10) Patent No.: US 7,455,154 B2
(45) Date of Patent: Nov. 25, 2008

(54) SHOCK ABSORBER

(75) Inventors: Ulrich Bantle, Empfingen (DE); Jürgen Eschle, Aichhalden (DE)

(73) Assignee: Karl Simon GmbH & Co. KG, Aichhalden (DE)

( * ) Notice: Subject to any disclaimer, the term of this patent is extended or adjusted under 35 U.S.C. 154(b) by 0 days.

(21) Appl. No.: 11/404,578

(22) Filed: Apr. 14, 2006

(65) Prior Publication Data
US 2006/0261526 A1 Nov. 23, 2006

(30) Foreign Application Priority Data
Apr. 29, 2005 (DE) .................. 10 2005 020 476

(51) Int. Cl.
*F16F 9/02* (2006.01)
*F16F 9/44* (2006.01)

(52) U.S. Cl. ............... 188/287; 188/282.7; 188/322.15; 267/156; 267/118; 267/124; 16/66; 16/84

(58) Field of Classification Search ............. 188/282.7, 188/322.15; 267/156, 118, 124; 16/66, 84
See application file for complete search history.

(56) References Cited
U.S. PATENT DOCUMENTS 2,737,384 A * 3/1956 Laugaudin et al. ....... 267/64.11
4,044,865 A * 8/1977 Tourunen ..................... 188/287
4,190,239 A * 2/1980 Schwankhart ............ 267/64.15
4,440,273 A * 4/1984 Butler ......................... 188/315

FOREIGN PATENT DOCUMENTS

DE     201 07 426 U1    10/2001
JP     01-307531        * 12/1989

* cited by examiner

Primary Examiner—Robert A. Siconolfi
Assistant Examiner—Mahbubur Rashid
(74) Attorney, Agent, or Firm—Pauley Petersen & Erickson

(57) ABSTRACT

A shock absorber with a shock absorber body having a cylinder. A piston is moveably guided in a receiving space of the cylinder. When the piston is moved, an air pressure generated in the receiving space exerts a braking force that acts on the piston. For air pressure reduction, the receiving space has at least one opening that produces an air-carrying connection between the receiving space and the environment. The shock absorber body has a simple design if the piston or the cylinder contains a receptacle into which an insert piece is inserted in a frictionally engaging fashion and if the opening is positioned between the insert piece and the wall of the receptacle that is touched by the insert piece.

31 Claims, 2 Drawing Sheets

SHOCK ABSORBER

BACKGROUND OF THE INVENTION

1. Field of the Invention

This invention relates to a shock absorber with a shock absorber body having a cylinder, a piston guided in a movable fashion in a receiving space of the cylinder, when the piston is moved an air pressure generated in the receiving space exerts a braking force that acts on the piston, and for air pressure reduction, the receiving space has at least one opening that produces an air-carrying connection between the receiving space and the environment.

2. Discussion of Related Art

A shock absorber is taught by German Patent Reference DE 20 107 426 U1, and uses a shock absorber body equipped with a cylinder. The cylinder encompasses a receiving space in which a piston is guided in a movable fashion. Extending from the receiving space of the cylinder, a bore leads into the piston bottom. The bore is connected to a cross bore.

This produces an air-carrying connection between the receiving space and the environment. A spring and a ball are inserted into the bore to produce a check valve. In order to secure the ball in captive fashion, the bore is tapped with an internal thread into which a screw is tightened. The screw has a sealing seat against which the ball rests in a sealing fashion. Downstream from the sealing seat, the screw contains a through bore. When the piston is traveling inward, an excess pressure is generated in the receiving space. A ball thus moves in the bore until air can escape into the environment through the cross bore. Once the pressure difference is balanced, then the ball closes the air-carrying connection again.

This known shock absorber is encumbered by a complex design with many parts. In addition, it does not achieve a satisfactory damping action. As soon as the ball lifts away from the sealing seat in the presence of an excess pressure, an abrupt pressure drop occurs. With shock absorbers used in furniture construction, however, a delayed pressure decrease is required for an optimum shock absorbing action. Due to production tolerances or temperature fluctuations, it is not possible to uniformly determine the lift-off time of the ball.

SUMMARY OF THE INVENTION

One object of this invention is to provide a shock absorber that has a uniformly favorable damping characteristic while having a simple design.

This object is attained according to this invention, because the piston or the cylinder contains a receptacle into which an insert piece is inserted in a frictionally engaging fashion. An opening between the insert piece and the wall of the receptacle is touched by the insert piece.

With this embodiment, a continuous pressure decrease requires a very small opening cross-section. This can be simply and reproducibly achieved by the embodiment disclosed according to this invention. The frictionally engaged connection between the insert piece and the receptacle assures a good seal between the insert piece and the receptacle everywhere, except for the opening. This seal is maintained in spite of temperature fluctuations and different expansions of the insert piece and receptacle. This makes the shock absorber very operationally reliable. Also, the shock absorber is easy to produce because forming the opening requires only that the insert body be placed into or against the receptacle.

According to one embodiment of this invention, the receptacle is a bore into which the insert piece embodied in the form of a cylinder or ball is inserted. The cylinder and the ball can be inexpensive, true-to-size, mass-produced parts.

If the receptacle is in the form of a bore and is adjoined by a cross sectionally reduced passage, which forms a shoulder, and the shoulder forms a stop for the insert piece, then this limits the inserting motion of the insert piece into the receptacle in a simple fashion. This also permits a precisely fit positioning of the insert piece.

If a material pairing is selected in which the material of the insert piece and the material of the receptacle are of different hardnesses, then the softer component rests against the harder component in a sealed fashion, producing a definite seal.

In particular, it is possible for the insert piece to be of metal and for the material comprising the receptacle to be a plastic, preferably a thermoplastic.

Production is facilitated if the shock absorber is embodied so that the opening is formed by a groove, which leads into the material of the receptacle, extends in a direction of the central longitudinal axis of the receptacle, and has a region oriented toward the receptacle that is covered by the insert piece.

In particular, the component forming the receptacle can also be produced as a true-to-size injection-molded component.

In one embodiment, the piston has a bellows section operationally connected to the cylinder as a function of the pressure ratios within the receiving space. The bellows section helps boost the braking force and is inflated when there is a pressure difference between the receiving space and the environment, an excess pressure in the receiving space. The bellows section then rests against the inner wall of the cylinder, thus increasing the friction of the piston. Thus, a particularly simple construction is achieved if the piston and the bellows section are integrally joined to each other because this reduces the sealing complexity.

The structural complexity can be further reduced if the piston rod is integrally formed onto the piston.

In one embodiment of this invention, the piston rod is associated with or has a supporting body and the supporting body has a stop surface situated outside the shock absorber body and the supporting body is supported against the piston via a shoulder.

Depending on the design, the supporting body can brace the piston rod. At the same time, the supporting body can also absorb the impact force, for example of a closing door or cover, and transmits at least part of it directly to the piston.

This is particularly advantageous if in addition, the piston and the bellows section are of soft elastic material. Then, the impact force impinges on the piston in a spring-elastic fashion and a portion of the impact force is canceled out by hysteresis.

The soft elastic embodiment of the piston and bellows section also makes it possible to achieve a material pairing with the cylinder that enables powerful damping by high coefficients of friction. If the piston rod is of a soft elastic material, then for strength reasons, the piston rod is braced by a casing part.

One alternative embodiment of this invention can be for the end of the piston rod oriented away from the piston to form an impact piece made of soft elastic material. The impact piece can absorb the impact force and immediately damp a portion of the impact.

If the bellows section has a cylindrical part that is kept spaced apart from the inner wall of the cylinder and the region encompassed by the cylindrical part is associated with a pressure chamber of the cylinder, then when subjected to pressure, the bellows section can rest against the inner wall of the cylinder on all sides, thus generating a uniform, powerful braking force.

The functionality of the bellows section can be further increased if the cylindrical part of the bellows section forms a spring receptacle that at least partially accommodates a spring and the spring supports the piston in relation to the cylinder, to counteract an inserting motion of the piston into the cylinder.

The construction is further simplified if the bellows section supports a sealing element formed onto it, which produces a seal between a pressure chamber and a negative pressure chamber of the cylinder.

The braking action of the shock absorber can be further increased if both the negative pressure chamber and the pressure chamber communicate with the environment in an air-carrying fashion by at least one opening.

This is possible particularly if the openings or the throttle elements associated with the openings are embodied so that they achieve a metered flow of air.

For example, a volumetric flow of air can be used to achieve a controlled pressure decrease and simultaneously, a favorable damping if at least one of the openings has a diameter D <0.2 mm, preferably <0.1 mm. In particular, diameters <0.1 mm achieve a favorable throttling action for use in furniture construction.

This damping can be achieved in a particularly satisfactory fashion if, in the region oriented toward the cavity, the ratio of the cross-sectional area of the piston to the opening cross section of the opening is greater than 4000/1.

BRIEF DESCRIPTION OF THE DRAWINGS

This invention is explained in view of an exemplary embodiment shown in the drawings, wherein.

DETAILED DESCRIPTION OF THE INVENTION

Figure 1:
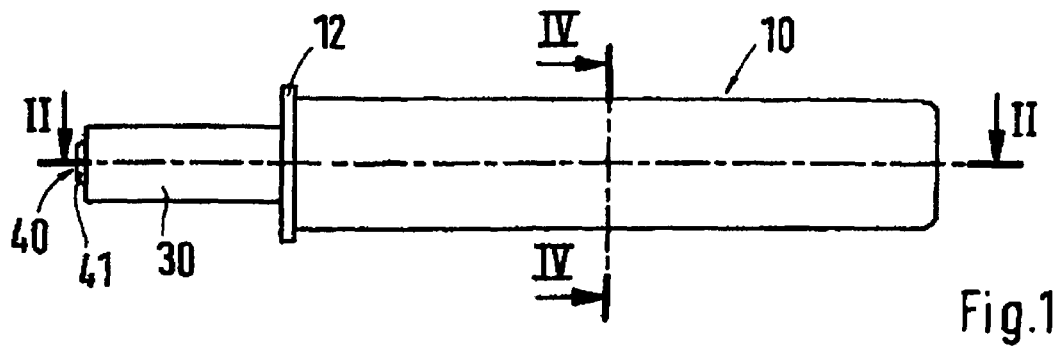
FIG. 1 is a side view of a shock absorber.
Figure 2:
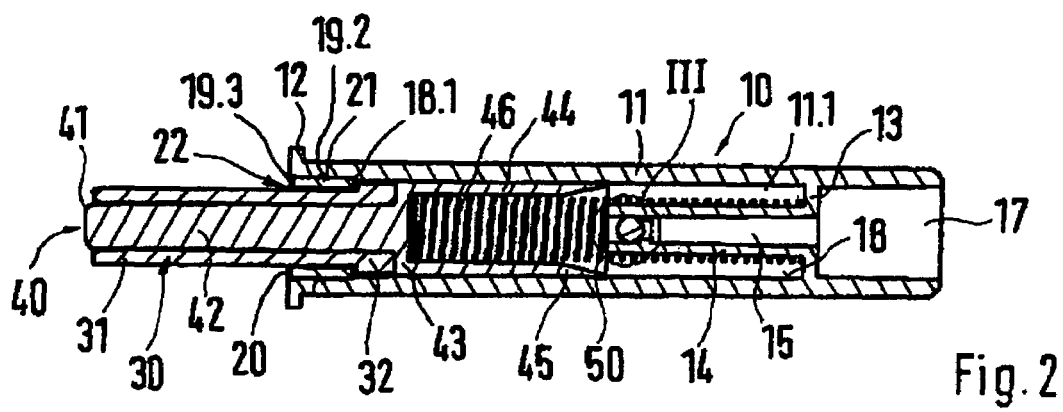
FIG. 2 is a section taken through the shock absorber, along line II-II shown in FIG. 1.

FIGS. 1 and 2 show a shock absorber with an elongated shock absorber body 10. The shock absorber body 10 forms a cylinder 11. The cylinder 11 encompasses a receiving space 11.1 in which a piston 43 of a sliding element 40 is contained in a linearly moving fashion.

A spring guide 14 in the form of a hollow cylinder, which is integrally formed onto a bottom 13 of the shock absorber body 10, protrudes into the receiving space 11.1. In the region of or near an end oriented away from the bottom 13, the spring guide 14 has an opening 16 in the form of a bore that will be explained in greater detail below in view of FIG. 3. The opening 16 provides a spatial connection between the receiving space 11.1 and an air conduit 15 encompassed by the spring guide. The diameter of the opening is <0.1 mm in order to permit a metered exchange of air between the receiving space 11.1 and the air conduit 15. In lieu of a bore, any other form of opening cross section can also be provided. Favorable damping properties are achieved if, in the end region oriented toward the receiving space 11.1, the ratio of the cross-sectional area of the piston 43 to the opening cross section of the opening is 4000/1.

The air conduit 15 extends in a cavity 17 formed by a cylindrical end section of the shock absorber body 10. The shock absorber body 10 is produced in the form of an injection-molded component. For demolding reasons, the inner wall 18 of the cylinder 11 is embodied with a slight opening cone so that the receiving space 11.1 expands slightly toward the region of the inlet opening oriented away from the bottom 13.

As mentioned, a sliding element 40 is guided in the receiving space 11.1. The sliding element 40 is one piece, including a piston rod 42, the piston 43, and a bellows section 44. The sliding element 40 can be embodied in the form of an injection-molded component and is of a soft elastic material, for example a TPM material.

The piston rod 42 is formed onto the end of the piston 43 oriented away from the bellows section 44. It is cylindrical in cross section and protrudes out from the receiving space 11.1 of the shock absorber body 10. At the end, it has an impact piece 41 embodied in the form of an end cap.

In an alternative embodiment, it is possible to eliminate the piston rod 42 formed onto the piston 43. The piston rod 42 is then solely formed by the supporting body 30. There does not necessarily have to be a mechanical connection between the piston 43 and the supporting body 30 in this embodiment. However, it is then advantageous to center these two components.

The piston rod 42 is encompassed by a supporting body 30. Thus, the supporting body 30 has a hollow, cylindrical receptacle with a cross section adapted to the outer cross section of the piston rod 42 and is comprised of a casing part 31. The material of the supporting body 30 is flexurally resistant so as to brace the piston rod 42. As shown in FIG. 1, the supporting body 30 is supported against the piston 43 with a radially thickened shoulder 32. The shoulder 32 can be used to guide the piston 43 and can be thickened radially so that it forms a guide along with the inner wall 18 of the receiving space 11.1. Depending on the design of the shoulder 32, it is possible to minimize the risk of the piston 43 tilting.

The bellows section 44 protrudes into the receiving space 11.1 and is embodied in the form of a hollow cylinder, preferably with uniform wall thickness, so that it has uniform work piece properties over its entire circumference, in particular a uniform expansion behavior. The wall can also be embodied as spherical or with a changing cross section in order to achieve a varying force. For example, it is possible to use a cross section that has a reduced cross section in the middle region. At its free, open end, the bellows section 44 has a circumferential sealing element 45 with a sealing lip that rests against the inner wall 18 of the receiving space 11.1 in a sealed fashion. The sealing element 45 can be embodied so that it produces a seal over the entire sliding range and, due to its material elasticity, compensates for the opening cone of the receiving space 11.1.

The bellows section 44 encompasses a spring receptacle 46 that contains a spring 50. The spring receptacle 46 is dimensioned so that it prevents the spring 50 from buckling. The spring 50 is supported with one end against the piston 43. The other end of the spring 50 rests against the bottom 13. The spring 50 is placed over the spring guide 14 that likewise prevents the spring 50 from buckling. The spring receptacle 46 is embodied so that the spring guide 14 and the spring 50 are accommodated in it upon insertion of the sliding element 40 and do not hinder the piston movement.

A stop element 20 fixes the sliding element 40 in the retracted end position shown in FIG. 1. The stop element 20 is embodied in the form of a ring and has a circumferential, bead-shaped detent projection 21 on its outer circumference. The stop element 20 has a hollow cylindrical passage 22 through which the casing part 31 of the supporting body 30 is guided. The outer diameter of the casing part 31 is adapted to the inner diameter of the passage so that a stable, linear guidance for the supporting body 30 is achieved. The material pairing between the supporting body 30 and the stop element 20 is selected so that a smooth support is achieved.

During assembly, the stop element 20 can be easily inserted into the receiving space 11.1 via a flared insertion opening 19.3 of the shock absorber body 10. The insertion movement is limited by a shoulder 18.1 of the shock absorber body 10. In its installed position, the detent projection 21 of the stop element 20 engages in detent fashion in the detent recess 19.2.

In the end position shown in FIG. 1, the stop element 20 supports the supporting body 30 at its shoulder 32 and thus supports the piston 43 in opposition to the prestressing force of the spring 50.

Figure 3:
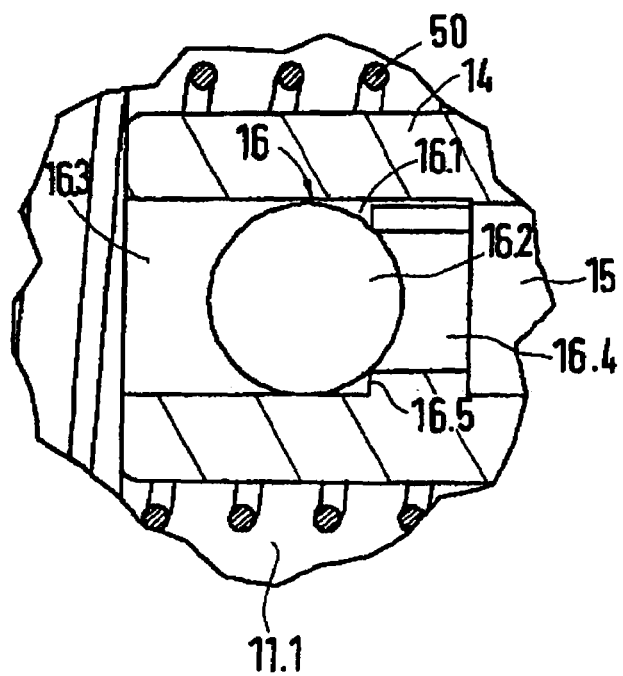
FIG. 3 is a view of a detail that is labeled III in FIG. 2.

FIG. 3 shows an enlarged detail of the end of the spring guide 14 oriented away from the bottom 13. As shown in the drawing, a bore-shaped receptacle 16.3 leads into the free end of the spring guide 14 and the receptacle 16.3 transitions into a similarly bore-shaped passage 16.4. The passage 16.4 is concentric to the receptacle 16.3 but has a smaller diameter, thus forming a shoulder 16.5.

Figure 4:
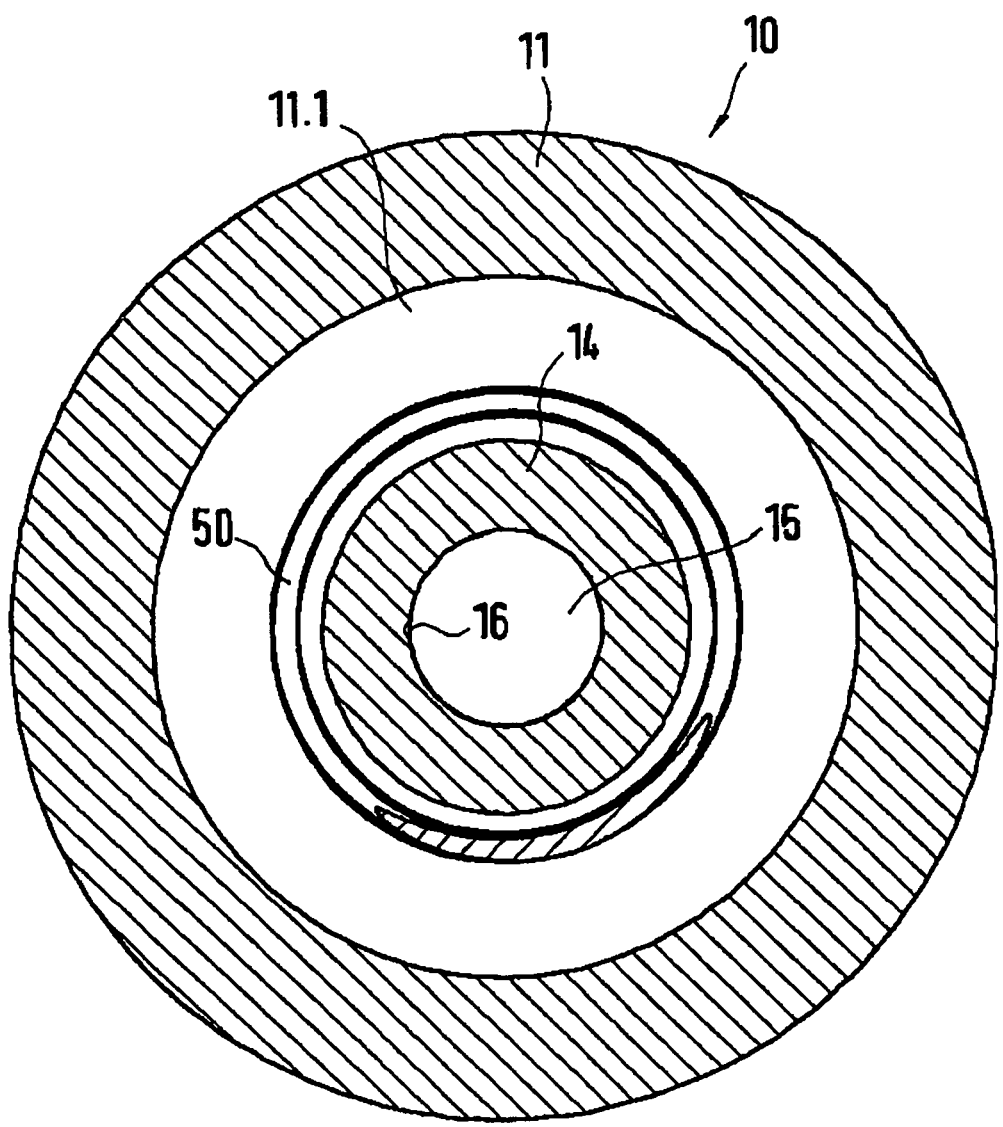
FIG. 4 is a sectional view taken along the cutting line labeled IV-IV in FIG. 1.

The receptacle 16.3 has a lateral groove let into it, which extends in a direction of the central longitudinal axis of the receptacle 16.3. The groove forms the opening 16, as shown in FIG. 4. The groove extends into the region of the passage 16.4 through opening 16.1 so that an air-carrying connection is produced between the receiving space 11.1 and the environment. The open side region of the groove is covered by an insert piece 16.2, thus producing the opening 16 shown in FIG. 4. The insert piece 16.2 in this embodiment is of a metal ball press-fifed into the receptacle 16.3 so that it is secured in the receptacle 16.3 in a frictionally engaging fashion.

The frictionally engaging connection also causes a deformation of the material of the receptacle 16.3 so that a seal is produced between the insert piece 16.2 and the receptacle 16.3.

A brief description of the function of the shock absorber follows, which is used, for example, in a piece of furniture with a hinge-mounted cover. Usually, the body of the piece of furniture has a receiving bore into which the cylindrical outer contour of the shock absorber body 10 can be inserted. When inserted, the flange 12 of the shock absorber body 10 comes to rest against the body of the piece of furniture in the region of the receiving bore.

The closing cover first comes into contact with the impact piece 41 of the piston rod 42. The mechanical impact noise of the cover is compensated for, by the elastic material properties of the impact by 41. The impact body 41 is deformed as a function of the impact energy of the cover. With a powerful impact, the impact body 41 is deformed completely into the casing part 31 and the cover comes into contact with the free end of the casing part 31. The piston rod 42 and the casing part 31 transmit the force to the piston 43. The annular contact of the shoulder 32 against the piston 43 assures a uniform introduction of force. Depending on the intensity of the impact energy, a portion of the energy can be damped by elastic deformation of the piston 43.

The piston 43 is slid into the receiving space 11.1. As a result, a pressure builds up in the receiving space 11.1, assisted by the sealing action of the seal 45. The pressure simultaneously increases via the opening 16.

If the pressure increase occurs in a shorter time span, then the pressure decrease does not occur to the same degree to which it occurs via the opening 16. An excess pressure with a damping action is thus generated in the receiving space 11.1 This excess pressure acts on the bellows section 44. Because atmospheric pressure prevails in the intermediate space between the inner wall 18 and the outer surface of the bellows section 44, a pressure difference arises. This causes the bellows section 44 to inflate so that it rests against the inner wall 18 and reinforces the damping action due to its sliding friction. The soft elastic material property of the bellows section 44 generates a correspondingly large amount of friction. If the pressure difference decreases, then the bellows section 44 returns to its initial position.

After the force acting on the piston rod 42 is released, the piston 43 returns to its initial position as shown in FIG. 1, assisted by the spring 50. This movement draws air from the environment into the receiving space 11.1 via the opening 16.

The opening is dimensioned so that the following properties of the shock absorber are achieved: controlled, slow pressure decrease to achieve a favorable damping action; and rapid pressure compensation in the return motion of the piston 43.

These properties can be achieved with the ratios described in this specification and in the claims.

German Patent Reference 10 2005 020 476.7-12, the priority document corresponding to this invention, and its teachings are incorporated, by reference, into this specification.

What is claimed is:

1. A shock absorber with a shock absorber body (10) having a cylinder (11), a piston (43) moveably guided in a receiving space (11.1) of the cylinder (11), when the piston (43) is moved an air pressure generated in the receiving space (11.1) exerts a braking force that acts on the piston (43), and for air pressure reduction the receiving space (11.1) has at least one opening (16) that produces an air-carrying connection between the receiving space (11.1) and the environment, the shock absorber comprising:

one of the piston (43) and the cylinder (11) having a receptacle (16.3) into which an insert piece (16.2) is press-fitted in a frictionally engaging manner, and the opening (16) is provided between the insert piece (16.2) and a wall of the receptacle (16.3) touched by the insert piece (16.2);

the opening (16) formed by a groove in the wall of the receptacle (16.3) that extends in a direction of a central longitudinal axis of the receptacle (16.3) and has a region oriented toward the receptacle (16.3) that is covered by the insert piece (16.2); and a bellows section (44) having a cylindrical part spaced apart from an inner wall of the cylinder (11), and a region encompassed by the cylindrical part is associated with a pressure chamber of the cylinder (11).

2. The shock absorber of claim 1, wherein the receptacle (16.3) is a bore into which the insert piece (16.2) embodied in a form of one of a cylinder and a sphere is inserted.

3. The shock absorber of claim 2, wherein the receptacle (16.3) is adjoined by a cross-sectionally reduced passage (16.4) which forms a shoulder (16.5), and the shoulder (16.5) forms a stop for the insert piece (16.2).

4. The shock absorber of claim 3, wherein a material of the insert piece (16.2) and a second material of the receptacle (16.3) are of different hardnesses.

5. The shock absorber of claim 4, wherein the insert piece (16.2) is of a metal and the material forming the receptacle (16.3) is of a plastic.

6. The shock absorber of claim 5, wherein the bellows section (44) is outwardly inflatable within the cylinder (11) by pressure within the receiving space (11.1).

7. The shock absorber of claim 6, wherein the piston (43) and the bellows section (44) are integrally joined to each other.

8. The shock absorber of claim 7, wherein a piston rod (42) is integrally formed onto the piston (43).

9. The shock absorber of claim 8, wherein the piston rod (42) is one of associated with and has a supporting body (30), the supporting body (30) has a stop end situated outside the shock absorber body (10), and the supporting body (30) is supported against the piston (43) via a shoulder (32).

10. The shock absorber of claim 9, wherein the piston rod (42) is braced by a casing part (31).

11. The shock absorber of claim 9, wherein the piston (43) and the bellows section (44) are of a soft elastic material.

12. The shock absorber of claim 11, wherein the piston rod (42) is braced by a casing part (31).

13. The shock absorber of claim 12, wherein an end of the piston rod (42) oriented away from the piston (43) forms an impact piece (41) of a soft elastic material.

14. The shock absorber of claim 13, wherein the cylindrical part of the bellows section (44) forms a spring receptacle (46) that at least partially accommodates a spring (50) and the spring (50) supports the piston (43) with respect to the cylinder and counteracts an inserting motion of the piston (43) into the cylinder (11).

15. The shock absorber of claim 14, wherein the bellows section (44) supports a formed sealing element (45) which produces a seal between a pressure chamber and a negative pressure chamber of the cylinder (11).

16. The shock absorber of claim 15, wherein the negative pressure chamber and the pressure chamber communicate with an environment by at least one opening (16, 16.1).

17. The shock absorber of claim 16, wherein at least one of the openings (16, 16.1) has a diameter D<0.2 mm.

18. The shock absorber of claim 17, wherein in a region oriented toward the cavity a ratio of a cross-sectional area of the piston (43) to an opening cross section of the at least one of the openings (16, 16.1) is greater than 4000:1.

19. The shock absorber of claim 1, wherein a material of the insert piece (16.2) and a second material of the receptacle (16.3) are of different hardnesses.

20. The shock absorber of claim 19, wherein the insert piece (16.2) is of a metal and the material forming the receptacle (16.3) is of a plastic.

21. The shock absorber of claim 1, wherein the bellows section (44) is outwardly inflatable within the cylinder (11) by pressure within the receiving space (11.1).

22. The shock absorber of claim 21, wherein the piston (43) and the bellows section (44) are integrally joined to each other.

23. The shock absorber of claim 1, wherein a piston rod (42) is integrally formed onto the piston (43).

24. The shock absorber of claim 1, wherein a piston rod (42) is one of associated with and has a supporting body (30), the supporting body (30) has a stop end situated outside the shock absorber body (10), and the supporting body (30) is supported against the piston (43) via a shoulder (32).

25. The shock absorber of claim 1, wherein the piston (43) and the bellows section (44) are of a soft elastic material.

26. The shock absorber of claim 1, wherein an end of a piston rod (42) oriented away from the piston (43) forms an impact piece (41) of a soft elastic material.

27. The shock absorber of claim 1, wherein the cylindrical part of the bellows section (44) forms a spring receptacle (46) that at least partially accommodates a spring (50) and the spring (50) supports the piston (43) with respect to the cylinder and counteracts an inserting motion of the piston (43) into the cylinder (11).

28. The shock absorber of claim 1, wherein the bellows section (44) supports a formed sealing element (45) which produces a seal between a pressure chamber and a negative pressure chamber of the cylinder (11).

29. The shock absorber of claim 28, wherein the negative pressure chamber and the pressure chamber communicate with an environment by at least one opening (16, 16.1).

30. The shock absorber of claim 1, wherein at least one of the openings (16, 16.1) has a diameter D<0.2 mm.

31. The shock absorber of claim 1, wherein in a region oriented toward a cavity a ratio of a cross-sectional area of the piston (43) to an opening cross section of the at least one opening (16, 16.1) is greater than 4000:1.

* * * * *